Jan. 3, 1961
C. FRASER ET AL
2,966,950
VEHICLE PARKING DEVICE
Filed April 22, 1958
2 Sheets-Sheet 1
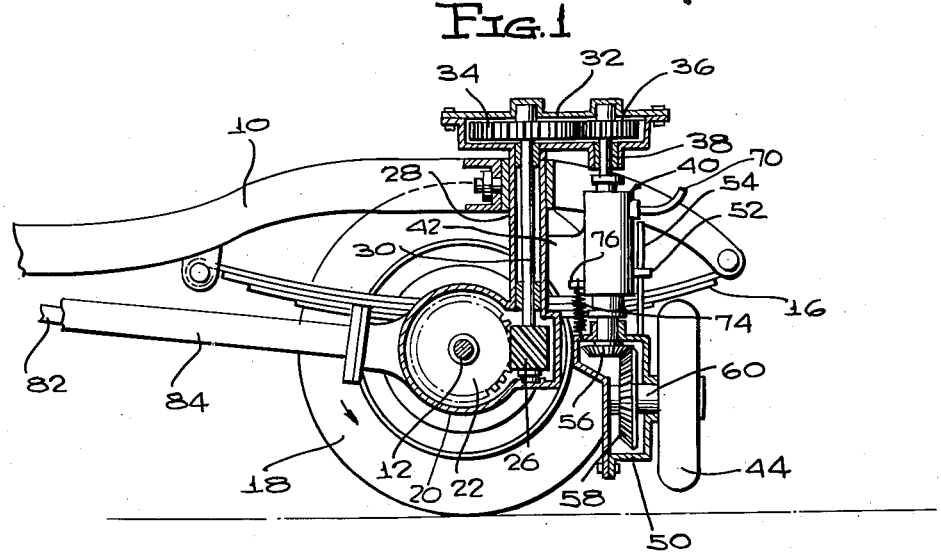
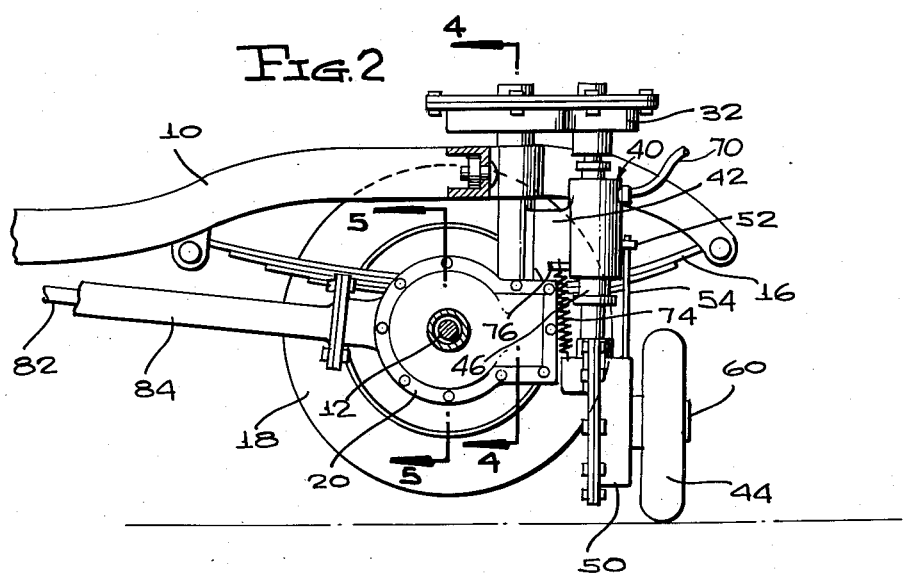
INVENTORS
CHARLES FRASER
HAYWARD A. SWYER
BY
McMorrow, Berman & Davidson
ATTORNEYS

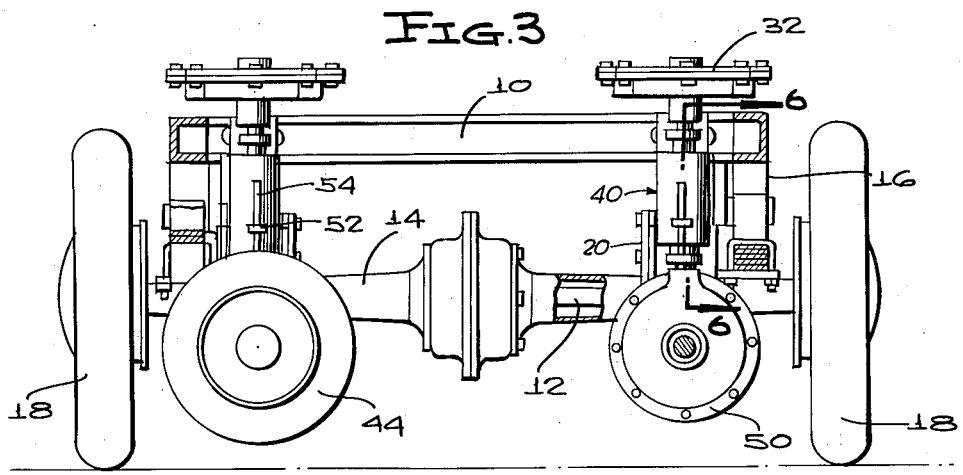
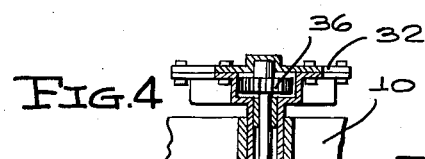
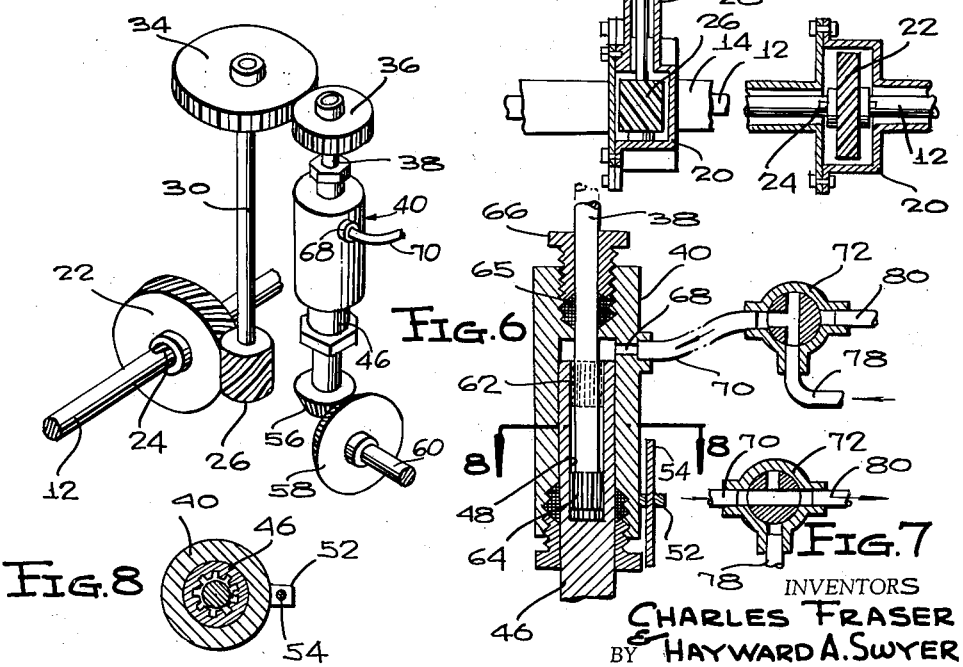
INVENTORS
CHARLES FRASER
& HAYWARD A. SWYER United States Patent Office 2,966,950
Patented Jan. 3, 1961

2,966,950

VEHICLE PARKING DEVICE

Charles Fraser, Montreal, Quebec, Canada (920 ACW Sq., APO 863, New York, N.Y.), and Hayward A. Swyer, Montreal, Quebec, Canada (15 Campbell Cresent, Kingussie, Inverness Shire, Scotland Filed Apr. 22, 1958, Ser. No. 730,087

2 Claims. (Cl. 180—1)

The present invention relates to a vehicle parking device.

An object of the present invention is to provide a vehicle parking device which enables a vehicle operator to shift the vehicle laterally over a road surface so as to park the vehicle in a space substantially no longer than the vehicle.

Another object of the present invention is to provide a vehicle parking device which is operatively connected to the rear wheels and driven by the same means driving the rear wheels of the vehicle.

A further object of the present invention is to provide a vehicle parking device which is simple in structure, one sturdy in construction, and one positive in action.

These and other objects and advantages of the present invention will be fully apparent from the following description when taken in connection with the annexed drawings, in which:

Figure 1 is a sectional view in elevation of one of the wheels of a vehicle with a portion of the vehicle frame, showing the device of the present invention installed thereon;

Figure 2 is an elevational view of the assembly shown in Figure 1, showing the parking wheel in a ground-engaging position supporting the vehicle wheel above the ground surface;

Figure 3 is an elevational view of the rearward portion of a vehicle frame with the rear wheels supporting the frame on a ground surface and with a pair of the parking devices of the present invention installed thereon, the tire or wheel of one of the devices being removed;

Figure 4 is a fragmentary sectional view of the drive means, taken on the line 4—4 of Figure 2;

Figure 5 is a sectional view taken on the line 5—5 of Figure 2;

Figure 6 is a sectional view, on an enlarged scale, taken on the line 6—6 of Figure 3, showing a control valve in actuating position;

Figure 7 is a sectional view of the control valve shown in Figure 6, shown in a nonactuating position;

Figure 8 is a sectional view taken on the line 8—8 of Figure 6; and

Figure 9 is an isometric view of the components of the present invention removed from their respective housings.

Referring in greater detail to the drawings in which like numerals indicate like parts throughout the several views, the reference numeral 10 designates a vehicle frame and the reference numeral 12 designates a rear axle associated with the frame 10 and rotatable in clockwise and counterclockwise direction. The axle 12 is supported for rotation in a rear axle housing 14 which is connected to the frame 10 by a conventional spring assembly 16. A drive wheel 18 adapted to engage a ground surface is carried on each end of the axle 12. The rear axle housing 14 is provided with a pair of auxiliary housings 20 inwardly of and adjacent each of the wheels 18 and a gear 22 is positioned within each of the auxiliary housings 20 and is secured by a key 24 to the adjacent portion of the axle 12. A pinion 26 is carried in the rearward portion of the housing 20 and is in mesh with the adjacent gear 22. A hollow cylindrical member 28 extends upwardly from each of the housings 20 and rotatably supports therein a drive shaft 30 carrying on its lower end the pinion 26. The cylindrical member 28 extends through the adjacent portion of the frame 10 and is slidable therein.

A gear housing 32 is carried on the upper end of each of the cylindrical members 28 and carries within it a pair of meshing gears 34 and 36, the former being secured to the upper end portion of the drive shaft 30 and the latter being secured to the upper end portion of a driven shaft 38. The lower end portion of the drive shaft 38 extends into a hydraulic cylinder assembly cylinder 40 and is rotatably supported therein, the assembly cylinder 40 being fixed by a web 42 to the rearward side of the cylindrical member 28 as shown most clearly in Figures 1 and 2.

The gear 22, pinion 26, drive shaft 30, and gears 34 and 36 constitute means drivingly connecting each of the vertically disposed driven shaft 38 to the axle 12 for rotation therewith in clockwise and counterclockwise directions.

A parking wheel 44, rotatable in clockwise and counterclockwise directions, is positioned adjacent each of the shafts 38 perpendicular to each of the drive wheels 18, the wheels 44 normally being spaced above a ground surface, as shown in Figure 1 and Figure 3.

Means is provided connecting each of the parking wheels 44 to the adjacent driven shaft 38 for rotation with the adjacent driven shaft 38 responsive to movement of the parking wheel 44 from the normal position above the ground surface to a position in engagement with the ground surface. Specifically, this means consists in a piston 46 within each of the hydraulic cylinder assembly cylinders 40, each of the pistons 46 being provided with a bore 48 extending inwardly from the upper end thereof and terminating at a point spaced from the upper end of the pistons 46. The lower end portion of each piston 46 extends exteriorly of and below the cylinder 40 and into a gear case 50. A lug 52 projects perpendicularly from the cylinder 40 intermediate the ends of the latter and is provided with an aperture through which extends a guide rod 54 which has its lower end fixedly secured to the upper end portion of the gear case 50. The guide rod 54 and lug 52 prevent the swiveling movement of the gear case 50 relative to the associated cylinder 40.

The lower end of each piston 46 carries a first beveled gear 56 in mesh with a second beveled gear 58 carried on one end of a stub axle 60 which is journaled in the side of the gear case 50. The other end of the stub axle 60 projects exteriorly of the gear case 50 and carries the parking wheel 44.

The portion of the bore 48 in the piston 46 inwardly of and adjacent the upper end is provided with splines, as at 62 in Figure 6, which are engageable with splines 64 provided on the lower end portion of the driven shaft 38 when the piston 46 is extended downwardly and outwardly of the cylinder 40. The piston splines 62 and the driven shaft splines 64 constitute a fixed clutch element and a cooperating clutch element engageable together responsive to movement of the parking wheels 44 from the normal position of engagement with the ground surface to a position in engagement with the ground surface.

A packing gland 65 is held in the bore provided in the upper and lower end of the cylinder 40 and a nut 66 holds the packing gland 65 in sealing engagement with the adjacent portion of each of the driven shafts 38 and each of the pistons 46 in a conventional manner.

An inlet port 68 is provided in each of the cylinders 40 inwardly of the upper end of the latter and is connected by a conduit 70 to a control valve 72 and to a source of fluid under pressure, such source including a reservoir for the storage of the fluid. Neither the source of fluid under pressure nor the reservoir is shown as not being a part of the present invention.

A coil spring 74 has its one end secured to a lug 76 which projects from one side of the web 42 and has its other end connected to the upper end portion of the gear case 50.

In operation, the valve 72 is manually turned to the position shown in Figure 6 and fluid under pressure is carried through a supply conduit 78 to the valve 72 and thence through the conduit 70 into the upper end portion of the cylinder 40. Separate valves 72 may be used for each of the cylinders 40 or a single valve 72 may be used for both of the cylinders 40 as desired. With the admission of fluid into the upper end portions of the cylinders 40, the pistons 46, each constituting a rotatable secondary driven shaft, are actuated to their extended downward position in which the wheels 44 engage the ground surface and raise the drive wheels 18 out of contact with the ground surface. The operator of the vehicle then puts the gears or transmission of the vehicle in condition for rotation of the rear axle 12 in one direction, either clockwise or counterclockwise, resulting in the rotation of the gears 22, pinions 26, shafts 30, gears 34 and 36, and by the engagement of the spline portion of the driven shaft 38 with the splines 62 on the pistons 46, the wheels 44 are caused to rotate in one direction to transport the rearward end portion of the vehicle laterally over the ground surface. This enables an operator of the vehicle to head the vehicle toward the curb with the forward end portion of the vehicle near the curb and the rearward end portion of the vehicle spaced from the curb and to shift the vehicle so that the rearward end portion of the vehicle is adjacent the curb and in alignment with the forward end portion of the vehicle.

When it is desired to move the rearward end portion of the vehicle away from the curb, the transmission of the vehicle is reversed to effect the rotation of the parking wheels 44 in the opposite direction, resulting in the moving of the vehicle away from the curb. The valve 72 is then turned to the position shown in Figure 7, at which time the coil spring 74 will retract the parking wheels 44 to their elevated position out of engagement with the ground with the fluid in the cylinders 40 returning to the reservoir through the return conduits 80. Driving power to the rear axle 12 is provided by a conventional drive shaft 82 mounted in a torque tube 84 and connecting the transmission of the vehicle with the rear axle 12 in the conventional manner.

What is claimed is:

1. The combination with a vehicle having a rear axle rotatable in clockwise and counterclockwise directions, and a drive wheel adapted to engage a ground surface connected to each end of said axle for rotation with the latter, of a vertically disposed driven shaft positioned inwardly of and adjacent each of said drive wheels, means drivingly connecting each of the driven shafts to said axle for rotation therewith in clockwise and counterclockwise directions, said means including a gear on said axle, a gear on said driven shaft, a drive shaft, a pinion on said drive shaft and in mesh with said axle gear, and a gear on said drive shaft and in mesh with said driven shaft gear, a parking wheel rotatable in clockwise and counterclockwise directions positioned adjacent each of said driven shafts and perpendicular to each of said drive wheels, each of said parking wheels being normally spaced above said ground surface, and means connecting each of said parking wheels to the adjacent driven shaft for rotation with the adjacent driven shaft responsive to movement of said parking wheel from the normal position to a position in engagement with said ground surface said last-named means including a vertically disposed hydraulic cylinder, a piston working upwardly and downwardly within said cylinder, said piston being provided with a bore extending from one end to an intermediate portion of said piston, the driven shaft having an end portion extending through said cylinder and into the bore, and cooperating clutch means in the upper end portion of the bore and said driven shaft end portion.

2. The combination according to claim 1, wherein the clutch means embodies cooperating splines on said driven shaft portion and said bore.

References Cited in the file of this patent

UNITED STATES PATENTS

| | | |
|---|---|---|
| 1,840,258 | Schafer | Jan. 15, 1932 |
| 2,162,257 | Hoecker | June 13, 1939 |
| 2,819,766 | Bisceglie | Jan. 14, 1958 |